United States Patent Office 2,852,584
Patented Sept. 16, 1958

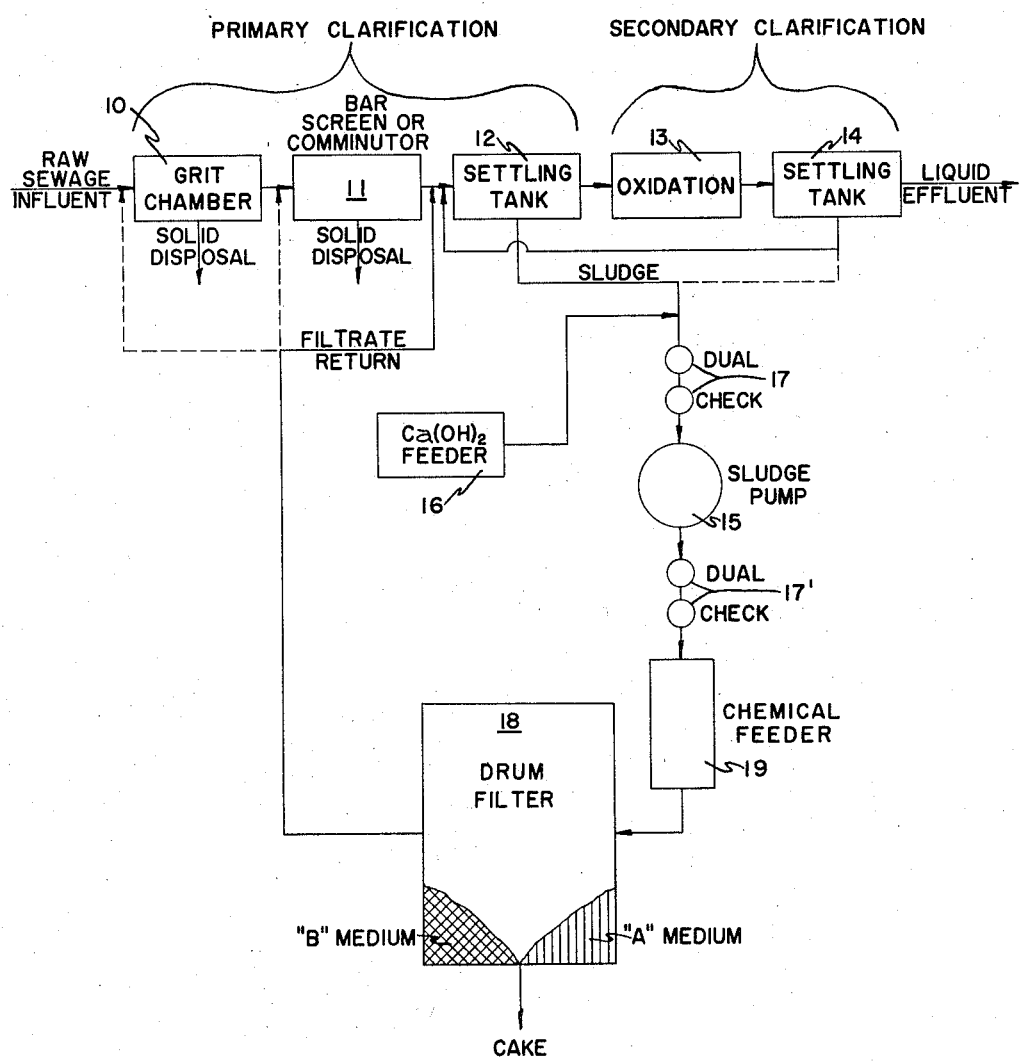

2,852,584

METHOD AND APPARATUS FOR FILTRATION OF UNDIGESTED SLUDGE

Thomas R. Komline, Gladstone, N. J., assignor to Komline-Sanderson Engineering Corporation, Peapack, N. J., a corporation of New Jersey Application September 13, 1954, Serial No. 455,398

5 Claims. (Cl. 210—46)

My invention relates to improvements in the disposition of municipal and industrial wastes. In particular, the invention comprehends novel procedure and apparatus for dewatering sewage or the like.

The degree of treatment of sewage and industrial waste material has been largely determined by conditions which relate to receiving waters into which effluent resultant from the process are to be discharged. Thus, if there was the likelihood of polluting open streams or inland waterways, or, if a health hazard would otherwise be present from incomplete treatment, a comprehensive program has generally necessitated the inclusion of primary and secondary clarification, digestion, conditioning, and sludge dewatering.

Primary clarification requires a series of mechanical expedients for extracting the coarser particles of raw sewage briefly including a grit chamber, bar screen or comminutor and a settling tank, together with suitable devices and equipment for pumping, conveying and discharge. Such equipment will remove about 60 percent of the settleable solids and a similar percentage of the B. O. D. (Biochemical Oxygen Demand) from the influent. When the requirements of the receiving waters are such that more of the solids and B. O. D. must be removed then, in addition to the primary clarification, a secondary clarification procedure is pursued which includes oxidizing the solids and nitrites remaining in the sewage effluent from primary clarification and a final clarifier. This oxidizing may be carried out by means of the activated sludge process or a trickling filter installation. The treated material must then be further settled in a final clarifier with the customary conveying and discharge requirements as for primary clarification.

The sludges collected from these clarifiers have been treated or disposed of by several methods. In a conventional system the sludge from both clarifiers is placed in a digester which is operated under anaerobic conditions, and in a matter of perhaps 30 days a large portion of the solid matter is broken down and a relatively inert material is obtained which can be disposed of by drying on sludge beds or dewatered on a rotary vacuum filter from whence the cake may be used for agricultural purposes directly or it may be further heat dried or incinerated. There are several basic reasons for digestion of the sludge. First, the solids as collected by either primary or complete treatment are foul and odorous and the digestion process delivers an inert inoffensive end product. Second, the digestion process gives off large amounts of methane which can be utilized for power either in pumping the sewage or in blowing air for the activated sludge process.

On the other hand, the use of digestion in waste treatment requires large and costly equipment and necessitates relatively large areas for operation, however, the art of disposing of sludge has not progressed to a point where the elimination of digestion equipment has been desirable for the average plant. This is particularly true since, in addition to this primary function, the digestion tanks have provided a relatively large intermediate storage area tending to equalize the rates of processing before and after this step in the treatment process.

There are a number of sewage disposal installations in the country in which it is the practice to dewater the settled solids directly from the clarifiers by rotary drum vacuum filters and to then dispose of the solids by either hauling the cake to a dump or utilizing heat drying and incinerating the material at disposal. Objections to this direct method are first, the problem of odors; second, the filter media previously utilized on the rotary drum vacuum filter clog or blind, and third, there is the problem of suitably utilizing the settled solids of sludge formed in the clarifier.

With these facts in mind, it is the principal object of this invention to provide a procedure for waste disposal of the nature indicated in which digestion is effectively eliminated without incurring the disadvantages enumerated. As a further object of the invention, I propose certain mechanical expedients, the use of which will permit regualtion in the flow of material through the various stages without reliance upon large intermediate capacities such as are afforded by digester tanks.

Accordingly, the process in my invention may briefly be outlined by reference to the items of equipment thru which the waste material passes in sequence as follows—

(a) Clarifier (or clarifiers depending on number of tanks and degree of treatment)
(b) Dual valve sludge pump
(b1) Lime feeder
(b2) Ferric chloride feeder
(b3) Auxiliary chemical feeders
(c) Rotary drum vacuum filters
(d) Cake disposal means
(e) Means for continuous return of solids of secondary clarifier to primary clarifier (used in conjunction with complete treatment only).

Observations and studies made on sludges obtained from clarifiers have demonstrated that, while they are foul and odorous as they are removed from the clarifiers, the addition of calcium hydroxide, when thoroughly dispersed with the sludges will immediately cancel and inhibit the odors and the odor then becomes one that is fresh and relatively innocuous. Part of my improved method is to introduce this calcium hydroxide in such a manner and at such a point in the pumping circuit that this property can be utilized.

Referring to the drawing, Figure 1, which is a diagrammatic flow chart tracing the passage of material from waste as received to discharge of effluent and dewatered solids according to the principles of this invention, the raw sewage influent first enters a grit chamber 10 and progresses to a bar screen or comminutor 11 from whence it passes to a settling tank 12, these three units being considered as elements for primary clarification. Heavy solids contained with the raw influent will be eliminated at the grit chamber and larger, coarser objects will be eliminated at the bar screen or comminutor; and suitable means is provided to remove heavy solids or floating debris at convenient times during the operation on this system. If the system includes a comminutor rather than a bar screen, the fine, shredded solids are such that they may pass along with the sewage to the settling tank. If, as hereintofore referred to, there is a need to employ oxidation in order to further increase the degree of treatment, the effluent from the primary settling tank is passed to an oxidation unit 13 and a second settling tank 14, these latter two units comprising a secondary clarifier. Solids from secondary clarification are either returned to the settling tank of the primary clarifier as in the full line of the diagram or added to the discharge of solids from the primary clarifier as in the broken line indicator.

With or without secondary clarification, the sludge from primary settling tank 12 will pass through the closed suction pipe line A directly without digestion to the sludge pump 15. Before reaching the pump the raw sludge is treated with calcium hydroxide from the proportioning feeder 16 which is regulated to add this chemical in accordance with the flow of sludge through the suction line of the pump. The calcium hydroxide is added in sufficient amount to thoroughly condition the sludge and, as indicated above, to eliminate nuisance odors. As is well known in the prior art, such addition of lime usually runs from about 6% to about 12% (average about 10%) based on the weight of dry solids.

For transferring the material of the sludge as collected in the clarifier I have developed an improved pumping auxiliary. Conventionally, a displacement type pump utilizing either a diaphragm or plunger in connection with a single check valve on each side of the plunger or diaphragm has been employed. Displacement pumps are easily rendered inoperative by, for example, a clothespin or other coarse item that may obstruct or hold open the usual ball check on either the suction or discharge side. I have added dual ball check valves 17, 17' in series to both the suction line A and discharge line B of the pump which has proven to be beneficial in the operation of this type of pump in that if some item holds open one of the ball checks, for example on the suction side, it is rare that there should be another item holding up the other ball check on this same side, and the pump will continue to operate. In practice it has been found that, whereas, a conventional pump with single check valves require freeing the valves several times per 8 hour day, when the single checks were replaced by the dual check valve system the pump would not have to be attended to for as long as 3 weeks. This provision constitutes a highly important discovery in connection with these sewage treatment systems, especially where the sludge pump also performs the function of a metering device so that the rate of flow of the sludge or residual material from the clarifying stage may be accurately controlled and determined as a basis upon which to calculate the quantities of injected material such as lime or other chemicals. Chemical feeders and auxiliaries thereto 19 are further applied to the system for coagulation or other requirements between the sludge pump 15 and filter 18 as may be necessary in accordance with tabulated items $b1$, $b2$ and $b3$ referred to hereinabove in the outline of the process.

A further improvement of my invention centers about the filter media on the rotary drum filter to which sludge is fed for rewatering. It has been previously considered necessary to use a "tight" filter medium in order to prevent the escape of solids into the filtrate and thence back into the sludge being dewatered. By a "tight" medium is inferred one where the interstices between woven threads is exceedingly small and the reasoning of course was to limit the openings to the size of particles being extracted.

I have found that if a coarse filter mesh is utilized on the filter drum, either in the form of a series of filaments fragmentarily illustrated as the "A" medium in the figure, which may be removed from the drum surface for discharge of the cake and washing prior to their return to the drum, or a fixed cloth material designated as the "B" medium, from which the cake is removed by scrapers or strings, and if the filter medium is kept open enough to permit the passage of a certain portion of the solids in the sludge the operation will be considerably improved. The actual filtration is accordingly a matter of depositing a layer of solid particles upon the "A" or "B" filter media and then straining everything else that is picked up by the pressure differential through the initial layer. In effect, this means that there is no positive classification or gradation that will be based on particle size since the filter would have no means of making this classification.

Specifically, the interstices presented in the case of a filament type filter may be of the order of .012 inch as referred to in my co-pending application for improvements in Filter Media, Serial Number 40,897, filed July 27, 1948, now Patent 2,699,260, granted January 11, 1955, in which case the interstices are effected between the individual coils of helical spring filaments. Alternatively, as in the case of a "B" medium, a similar spacing may be effected by using tough, wear resistant, woven plastic material such as "Saran" (polyvinylidene chloride) or the recently developed "Teflon Fibre" (tetrafluor ethylene). In the case of either of these plastics there are the recognized properties of resistance to chemical attack which is of considerable importance when dealing with municipal and industrial wastes. The fundamental in either the filament or woven medium is to present large interstices as compared with earlier practices in the working medium in order to avoid blinding and to permit free discharge, while at the same time regulating filtration by the initial layer of solids which accumulate on the medium.

As indicated above, in the development of the general purposes of the present invention, the use of ordinary closely woven fabric filtering media on the conventional rotary drum vacuum filters has not been found satisfactory since the filter cloth material clogs and blinds too quickly, and the entire process is slowed down and rendered very uneconomic. It has been believed that the filter medium had to be of an exceedingly fine mesh to prevent the passage of "fines" from the residual material from recirculating through the system, it being thought that this initial excess passage of fines would render the process inoperative or inefficient. However, the applicant has discovered that the use of coarse filtering media upon which the initial solid matter may build up and provide its own eventual filtering medium, has worked with great efficiency and has increased greatly the speed of operation of the novel system. Surprisingly, it has been found by the present applicant that the fines which pass through the coarse medium are of such nature that they readily settle in the settling tanks during recirculation of the filtrate.

What is probably more significant in relation to the present invention, is the unexpected effectiveness of the filter arrangement provided by the present invention in the over-all retention of fines in the filter cake over that found in the filtrate, this percentage ranging from approximately about 80% to 98%. At the same time, the rate of filtering is increased tremendously over the rate when the usual close woven cloth is used.

Sludge from the rotary drum filter 18 may, as in the case of dewatered sludge from a digestion process, be used directly for agriculture or may be dried or incinerated as desired. Effluent from the filter is returned to primary clarification at one of the three points indicated by the full line indicator or the broken line alternates.

From the above description, it will be seen that the applicant's system of sewage sludge treatment is substantially continuous and does not include any stages or steps involving digestion, prolonged mixing, thickening, storage, or any other prolonged interruption in the continuous flow of sewage. Obviously, this statement does not include any such momentary interruptions as for maintaining fluid levels as in the vat or sump of the drum filter, or overnight shut-downs or other usual maintenance interruptions. Thus, the phrases "continuous flow" and "without cessation of progressive movement" are to be interpreted as they occur in the claims to admit of these conventional exceptions.

Having thus described my invention, I claim:

1. In the art of sewage treatment, wherein solids are progressively removed from the sewage in a series of treatment units in accordance with their size and physical and chemical characteristics, the process which basically includes the successive steps of clarifying the sewage, transferring the settled sludge from the clarifying process to a drum-type vacuum filter; said process characterized by the facts: first, that the sludge is pumped toward said filter without subjecting it to a digestion period; second, that the sludge is pumped through a closed line from the clarifying stage toward the filter and during its progress through said line a quantity of calcium hydroxide is introduced into the flow of sludge in said closed line, and in quantities proportioned to the amount of dry solids in the sludge to condition and deodorize the sludge; third, that during the passage of the sludge through the filter there is progressively created upon the surface of the filter medium, a filtering layer consisting of solids contained in the sludge, and the further subsequent flow of sludge through the filter is filtered by means of said filter layer, thus accumulating further solids thereon in the form of a filter cake; fourth, that the filtrate from the drum-type vacuum filter is recirculated to repeatedly pass through at least a portion of the clarifying stage, whereupon the suspended solids carried through with the filtrate are resettled and refiltered, the process as described permitting a larger quantity of suspended solids to pass through the filter into the filtrate than in conventional sewage sludge filtering methods, but without deleterious effect on the process; and fifth, that the filter cake and the effluent from the clarification process are appropriately disposed of.

2. The sewage treatment process as set forth in claim 1 in which the sludge from its discharge from the clarification stage to the filtration stage and the recirculation of the filtrate, comprises a continuous flow of sludge and filtrate without cessation of progressive movement.

3. In the art of sewage treatment, wherein solids are progressively removed from the sewage in a series of treatment units in accordance with their size and physical and chemical characteristics, the process which basically includes the successive steps of clarifying the sewage, transferring the settled sludge from the clarifying stage to a drum-type vacuum filter; said process characterized by the facts: first, that the sludge is pumped toward said filter without subjecting it to a digestion period; second, that in the pumping stage of the process the sludge is passed sequentially through a plurality of pump suction valves, thence through the pump proper, and thence sequentially through a plurality of pump discharge valves; third, that the sludge is pumped in a closed line from the clarifying stage to the filter and during its progress through said line a quantity of calcium hydroxide is introduced into the flow of sludge through said closed line, and in quantities proportioned to the amount of dry solids in the sludge to condition and deodorize the sludge; fourth, that before filtration of the sludge a quantity of complementary conditioning chemical is added; fifth, that during the passage of the sludge through the filter there is progressively created upon the surface of the filter medium, a filtering layer consisting of solids contained in the sludge, and the further subsequent flow of sludge through the filter is filtered by means of said filter layer, thus accumulating further solids thereon in the form of a filter cake; and sixth, that the filtrate from the drum-type vacuum filter is recirculated to repeatedly pass through at least a portion of the clarifying stage, whereupon the suspended solids carried through with the filtrate are resettled and refiltered, the process as described permitting a larger quantity of suspended solids to pass through the filter into the filtrate than in conventional sewage sludge filtering methods, but without deleterious effect on the process; and seventh, that the filter cake and the effluent from the clarification process are appropriately disposed of.

4. An installation for sewage treatment, wherein solids are progressively removed from fluid sewage in accordance with their size and physical and chemical characteristics, said installation consisting of the following units together with means for effecting transfer of residual material successively and continuously from one to the other of the units in the order named: a preliminary classifying and clarifying unit including a settling tank; a closed conduit line extending from the settling tank toward a drum type vacuum filter; means for injecting lime into the sludge while it is passing through said closed conduit line; a sludge pump in said line; a drum type vacuum filter into which said line from the pump feeds, said filter having a coarse filtering medium against which an initial layer of solids contained in the flowing material is built up to provide a filtering layer for subsequently arriving material upon the filter.

5. An installation for sewage treatment, wherein solids are progressively removed from fluid sewage in accordance with their size and physical and chemical characteristics, said installation consisting of the following units together with means for effecting transfer of residual material successively and continuously from one to the other of the units in the order named: a preliminary classifying and clarifying unit including a settling tank; a closed conduit line extending from the settling tank toward a drum type vacuum filter; means for injecting lime into the sludge while it is passing through said closed conduit line; a sludge pump in said line; said pump being a displacement pump having a plurality of suction check valves arranged in series in the intake portion of the line and a plurality of discharge check valves arranged in series in the outlet portion of the line; means for adding a complementary conditioning chemical to the sludge before filtration; a drum type vacuum filter into which said line from the pump feeds, said filter having a coarse filtering medium against which an initial layer of solids contained in the flowing material is built up to provide a filtering layer for subsequently arriving material upon the filter.

References Cited in the file of this patent

UNITED STATES PATENTS

| | | |
|---|---|---|
| 1,338,999 | Peck | May 4, 1920 |
| 1,967,197 | Besselievre | July 17, 1934 |
| 1,999,973 | Genter | Apr. 30, 1935 |
| 2,072,154 | Butterfield | Mar. 2, 1937 |
| 2,164,142 | Moore | June 27, 1939 |
| 2,229,582 | Merrill | Jan. 21, 1941 |
| 2,254,953 | Thomas | Sept. 2, 1941 |
| 2,551,175 | Smith | May 1, 1951 |
| 2,699,260 | Komline | Jan. 11, 1955 |